United States Patent [19]

Sasaki

[11] Patent Number: 5,521,477
[45] Date of Patent: May 28, 1996

[54] EVALUATION METHOD OF COATING SAG AND COATING CONTROL SYSTEM UTILIZING SAID METHOD

[75] Inventor: Hitoshi Sasaki, Higashi-Hiroshima, Japan

[73] Assignee: Mazda Motor Corporation, Hiroshima-ken, Japan

[21] Appl. No.: 293,617

[22] Filed: Aug. 22, 1994

[30] Foreign Application Priority Data

Aug. 25, 1993 [JP] Japan .................................. 5-210132
Apr. 28, 1994 [JP] Japan .................................. 6-091344

[51] Int. Cl.⁶ .................................................. G05B 19/42
[52] U.S. Cl. ..................... 318/568.18; 318/567; 364/192; 901/43
[58] Field of Search ..................... 318/560–646; 118/7, 12, 323, 668, 697, 302, 314, 631; 427/240, 346, 55, 388.2, 424, 46, 429, 379, 421, 388.1, 265, 409, 425, 142; 73/619, 634, 54, 64.4, 56; 364/474.37, 192; 901/44, 47, 43

[56] References Cited

U.S. PATENT DOCUMENTS

| | | | |
|---|---|---|---|
| 3,561,398 | 2/1971 | Rose | 118/12 |
| 4,864,966 | 9/1989 | Anderson et al. | 118/668 |
| 4,881,177 | 11/1989 | McClean et al. | 901/44 |
| 4,919,977 | 4/1990 | Yamane et al. | 427/379 |
| 4,968,530 | 11/1990 | Yamane et al. | 427/142 |
| 4,985,283 | 1/1991 | Ogata et al. | 427/424 |
| 4,988,537 | 1/1991 | Tanimoto et al. | 427/46 |
| 5,024,080 | 6/1991 | Backes | 73/54 |
| 5,063,085 | 11/1991 | Yamane et al. | 427/240 |
| 5,091,215 | 2/1992 | Tanimoto et al. | 427/240 |
| 5,184,051 | 2/1993 | Schweiker et al. | 318/567 |
| 5,273,059 | 12/1993 | Gross et al. | 134/57 R |

FOREIGN PATENT DOCUMENTS 2-280865  11/1990  Japan .

*Primary Examiner*—Paul Ip
*Attorney, Agent, or Firm*—Keck, Mahin & Cate

[57] ABSTRACT

A method for evaluating a coating sag includes the steps of determining a coating thickness on a specific coating surface, evaluating an inclination of the specific coating surface, determining a criticality of a coating sag on a vertical surface at which a coating sag is produced and evaluating whether or not a coating sag is produced on the specific coating surface based on the inclination of the specific coating surface and the coating thickness on the specific coating surface in view of the criticality on the vertical coating surface as a reference. It is possible to determine coating conditions which can effectively prevent a coating sag during the coating action even if it is made on an inclined coating surface.

14 Claims, 12 Drawing Sheets

EVALUATION METHOD OF COATING SAG AND COATING CONTROL SYSTEM UTILIZING SAID METHOD

BACKGROUND OF THE INVENTION

1. Field of the Invention

The present invention relates to an evaluation method for evaluating a coating sag and a coating control system utilizing the evaluation method.

2. Related Art

In the field of automotive industry utilizing various kinds of robots, various problems concerning the robots have recently been produced. For example, the structure and function of the robot have become complicated so that it is difficult to design a robot of a desirable structure and function. Teaching the robots is also complicated and takes long considering that a number of robots are employed and that kinds or variations of vehicles are increased.

In order to deal with the above problems, a robot simulation system utilizing CAD (computer aided design), in which a teaching operation is performed by means of a computer simulation, is expected. In case of a coating robot among the various robots, it is important to control not only a coating line of coating gun on a work to be coated but also coating conditions, such as a discharge amount of the coating material, coating speed and the like. Therefore, it is necessary for a robot teaching system according to the computer simulation to perform the teaching of such coating conditions appropriately.

Meanwhile, when introducing a robot into a manufacturing line of the automotive vehicles, it is necessary to design how the robot is operated. In other words, it is necessary to make a teaching of the robot operation in advance. The design or teaching of the robot operation is to first determine a series of tasks to be done by the robot, then determine details of each of the tasks, such as layout of the robot, tool for the robot, operation order to be done by the robot, peripheral installment of the robot and the like evaluating attitude, such as three dimensional position orientation of the robot, and operation efficiency (such as operation cycle, moving distance of the robot and the like).

At this stage of the design or basic teaching of the robot operation, an actual robot and work or object to which the robot is applied are not used. Therefore, a robot designer is required to design the robot operation or movement based on his three dimensional imagination. This conventional way of the robot design or teaching, however, often results in inconvenient or deficient robot performance due to the uncertainty during the design work of the robot.

In order to solve the above problem, it is preferable to introduce a teaching play back system for teaching the robot. In the proposed teaching play back system, which is a so called direct teaching play back system, the robot teaching is directly applied on an actual robot operating actually the robot using an actual work. However, this system is time consuming and costly.

In order to deal with such problems, recently it is proposed to introduce a computer simulation method for designing the robot operation (CAD simulation). The CAD simulation is to perform teaching a robot utilizing a computer simulation system, instead of utilizing the direct teaching play back system in which each robot is directly subjected to a teaching. In the CAD simulation system, a robot, jig, peripheral installments and the like are displayed on a screen of CAD system so that the teaching is performed through a computer simulation on the screen. The teaching data obtained through the CAD simulation is loaded down on an actual robot to be operated properly.

The CAD simulation is further explained with regard to a robot in the field of the automotive industry.

First, working data are determined. The working data includes all information concerning a robot operation, such as configuration of work, kind of work such as body, bumper, information concerning coating gun, jig and the like. Then, teaching data for a robot are determined through a computer simulation which is performed based on the working data. The resultant teaching data are examined if there is a contradiction between the data, or if the operation cycle time is suitable with an automatic simulation mode of the computer. When the teaching data are held appropriate, the teaching data are converted to a machine language and loaded down on an actual robot. The robot is operated in accordance with the teaching result.

The above mentioned CAD simulation works out for a specific kind of robots such as a welding robot as far as a position, speed, moving line of the robot and the like are properly provided, since objects of those kinds of robots can be accomplished merely by controlling the movement of the robots.

On the contrary, in a case of a coating robot as disclosed in Japanese Patent Public Disclosure No. 2-280865, it is important to control not only the movement of the robot but also coating conditions or coating variables for determining a coating thickness. Thus, in this type of robot, mere moving line control of the robot is not enough to obtain a desirable performance. The coating conditions include, in particular, a discharging amount of a coating material, coating electrostatic voltage, atomization pressure of the coating material and the like.

Conventionally, the coating conditions are determined through the direct teaching play back system using the actual robot even though the teaching of the robot movement is performed by means of the CAD simulation. The teaching of the coating robot according to the direct teaching play back system is made so as to determine a coating line to be taken by a coating gun based on a shape, position of a vehicle body and the like to be coated. Then, the coating line data is stored in a memory of a control unit. A number of teaching points are provided on the determined coating line of the robot. A coating speed, delivery amount of the coating material, a discharging direction of the coating material and the like concerning the respective teaching points are determined and data providing the above coating conditions are stored in a memory. In addition, robot operation data are formed on the coating robot for moving the coating gun in accordance with the coating line data, operation data. Then, a control program including the coating condition data and operation data for the coating robot is finally determined.

After teaching, the coating robot is operated in accordance with the control program which is provided by the control unit. The coating robot moves the coating gun along the coating line determined and controls the coating gun to make a coating action of a vehicle body in accordance with the determined coating conditions, which include the coating speed, coating amount, coating direction and the like.

It should, however, be noted that the conventional robot teaching in determining the coating conditions or coating variables according to the direct play back teaching is needed to provide a number of teaching points and therefore increase the number of steps to be done. In addition, since the actual coating robot and the actual work, such as vehicle body to be coated, have to be used for performing the teaching action, the time for the teaching action is quite restricted. Therefore, it is difficult to obtain an optimized control program for the robot. In order to deal with the above problems, it is also proposed that a computer simulation to be introduced to perform the teaching of the coating conditions (simulation teaching play back) in order to eliminate such actual use of the coating robot and work.

However, it is difficult to determine desirable coating conditions of the coating robot through the conventional CAD simulation even if a number of teaching points are provided for getting data of the coating conditions, such as coating speed, coating amount, discharging direction of the coating material and the like. This is because the coating conditions conventionally determined through the CAD simulation is not enough to control the performance of a coating robot.

In view of this, it is proposed that a coating efficiency on a work or object to be coated is calculated in addition to the conventional coating conditions at the respective teaching points and that the coating efficiency to be taken into account in performing the teaching of a coating, robot.

The coating efficiency means a ratio of an amount of a coating material forming a coating actually deposited on a coating surface to be coated to that of the coating material discharged toward the coating surface from the coating gun. The coating efficiency can be obtained by a multiple regression analysis method utilizing a coating material atomization pressure and coating electrostatic voltage as control variables or further including a discharging amount of the coating material from the coating gun and a distance between the gun and the coating surface in addition to the atomization pressure and electrostatic voltage as control variables. The above coating deposited on the coating surface means a coating layer which is discharged on the coating surface and dried and shrunk.

Accordingly, the control variables determined based on both the input variable data and the coating efficiency are reliable to control the robot performance so that the control program in accordance with the control variables determined by means of the above teaching method provides a desirable coating.

It should, however, be noted that although the above method can provide a desirable result in a case of a flat coating surface, it is not well applicable to a coating surface of a work having an undulation or unevenness, such as engine room, trunk room of an automotive vehicle or if the coating surface is inclined since it is difficult to provide accurate control variables. In other words, the above method is disadvantageous in that if there is an inclination, undulation or unevenness in the coating surface, it is difficult to provide a uniform thickness of coating.

Further, if the coating surface is inclined with regard to the orientation of the gun, or with regard to the vertical direction, the coating thickness varies from place to place. Otherwise, a sagging of coating is undesirably produced.

SUMMARY OF THE INVENTION

It is therefore one object of the present invention to provide a coating method which can provide a desirable and uniform thickness of coating even though a coating surface of a work is uneven or inclined.

It is another object of the present invention to provide a method for evaluating a coating sag of a coating material on a coating surface in the case of inclined coating surface.

It is further object of the present invention to provide a coating control system which can prevent the coating sag or lack of hiding on the coating surface effectively.

It is still another object of the present invention to provide a method which can evaluate a coating sag accurately to obtain a desirable uniform coating irrespective of configuration, or unevenness of a coating surface of a work to be coated.

The above and other objects of the invention can be accomplished by a method for evaluating a coating sag comprising steps of determining a coating thickness on a specific coating surface, evaluating an inclination of the specific coating surface, determining a criticality of a coating sag on a vertical surface at which a coating sag is produced a vertical coating surface, and evaluating whether or not a coating sag is produced on the specific coating surface based on the inclination of the specific coating surface and the coating thickness on the specific coating surface in view of the criticality on the vertical coating surface as a reference.

Preferably, the method further comprises step of determining a coating efficiency which is a ratio of an amount of a coating material forming a coating actually deposited on the specific coating surface to that of the coating material discharged toward the coating surface from a coating gun. Then, the coating thickness of the specific coating surface is determined by means of a simulation taking account of the coating efficiency.

In another aspect of the present invention, the method further comprises a step of determining coating conditions or coating variables, such as a discharging amount of the coating material, a position of a coating gun, an orientation of the coating gun, an electrostatic voltage for a coating, atomization pressure of the coating gun, moving speed of the coating gun, distance between the gun and the coating surface. Whether or not a coating sag is produced is evaluated by means of a simulation, preferably, a CAD simulation, using the coating variables determined in advance or through the simulation. The coating robot is controlled based on the result of the above evaluation. In a preferred embodiment, the method of evaluating the coating sag according to the present invention can be suitably applied to a coating action of a vehicle body.

According to another aspect of the present invention, a coating control system for controlling a coating robot which performs automatic coating for a work comprises coating line determining means for determining a coating line along which the coating robot is moved over the work, data entry means for entering various known data concerning the coating action done by the coating robot, control variable setting means for setting coating control variables in accordance with the coating line set by the coating line setting means and the various information entered by the data entry means, robot simulation means for performing a robot simulation of the coating action done by the coating robot based on the control variables so as to determine a control program based on the result of the robot simulation, and robot control means for controlling the coating robot in accordance with the control program set by the robot simulation means.

Preferably, the control variable setting means calculates the coating efficiency of the coating material and determines a coating thickness on a specific coating surface based on the coating efficiency. The robot simulation means evaluates whether or not a coating sag is produced based on the coating thickness determined by the control variable setting means and the inclination of the coating surface, and performs the simulation of the coating action by the coating robot based on the evaluation.

According to the present invention, a coating thickness and inclination of the coating surface with regard to the vertical direction are determined and an evaluation is made as to whether a coating sag is produced based on the coating thickness and the inclination of the coating surface. Consequently, it is possible to determine coating conditions which can effectively prevent a coating sag during the coating action even if it is made on an inclined coating surface.

According to the preferred embodiment, the coating thickness of the specific coating surface is determined by means of the simulation by setting the coating efficiency so that the determination of the coating thickness can be always properly made even if there is unevenness on the coating surface.

According to a still another embodiment of the present invention, an evaluation as to whether or not a coating sag is produced is made by means of a simulation based on control variables for controlling the coating action done by the coating robot. The control of the coating robot is made based on the evaluation whether or not the coating sag is produced is properly made so as to effectively prevent the coating sag.

According to further embodiment of the present invention, the above evaluation as to whether or not a coating sag is produced is made on a coating surface of a vehicle body. Thus, the coating action of the vehicle body of which coating surface is usually uneven can be properly done without producing any coating sag during the coating action.

According to a further embodiment of the present invention, a coating control program is determined through a simulation, preferably CAD simulation, so as to readily and effectively perform teaching of the coating robot for the coating.

According to still another embodiment of the present invention, the determination of the coating thickness and the evaluation of the coating sag is made by means of a simulation in which a robot is moved to perform a coating action on a screen or display of CRT and the like as if it is controlled to make actual coating action on a work. Therefore, it is possible to readily determine coating conditions by controlling the simulated coating action of the coating robot on a display which can effectively prevent a coating sag.

The above and other objects, advantages and novel features of the present invention will become fully apparent from the following detailed descriptions taking reference with the accompanying drawings.

DETAILED DESCRIPTION OF THE PREFERRED EMBODIMENTS

Figure 1:
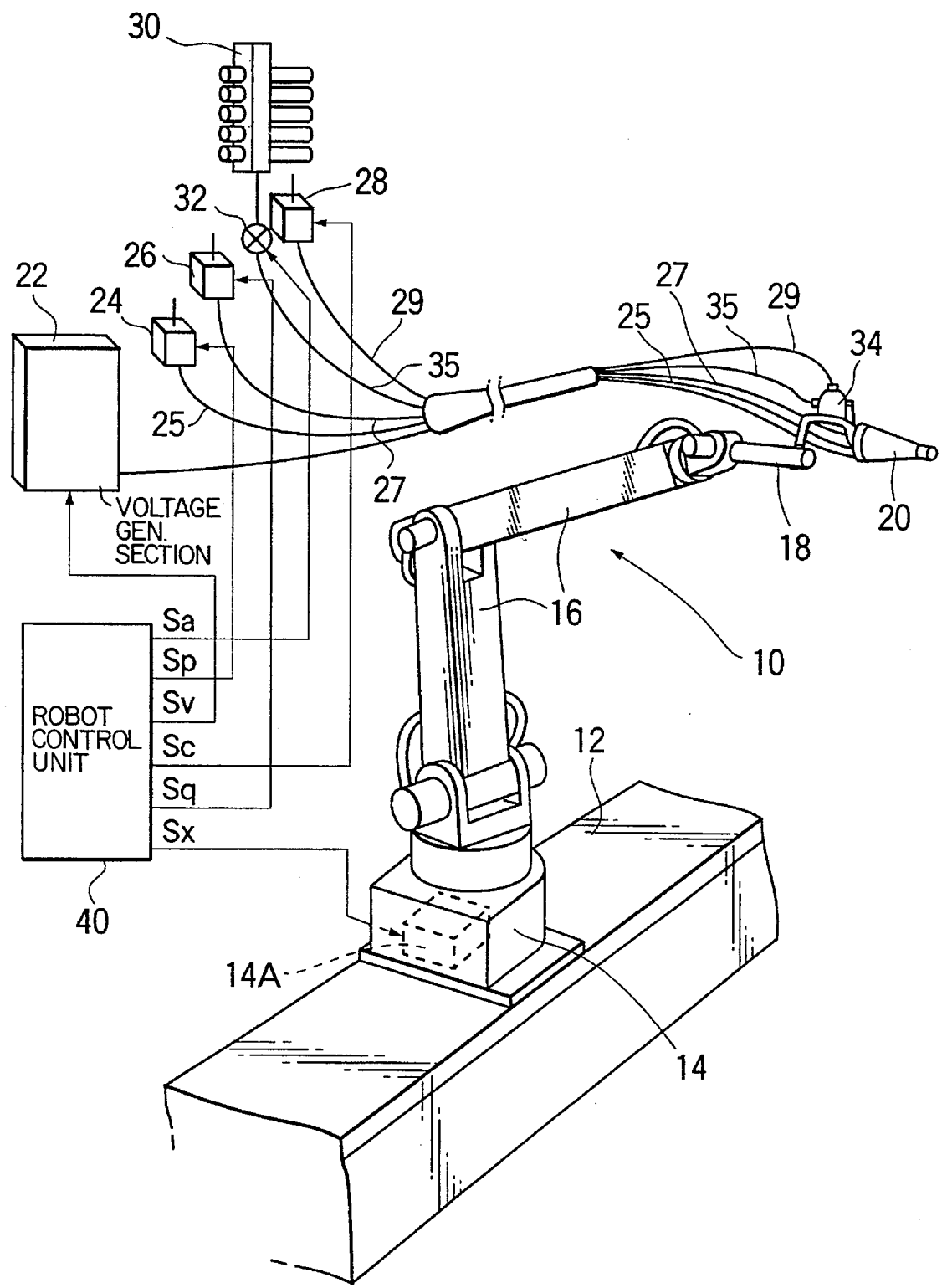
FIG. 1 is a schematic perspective view showing a coating robot to which the present invention can be properly applied.

A preferred embodiment according to the present invention will be described in detail hereinbelow.

Referring to FIGS. 1 through 4, a coating robot 10 with a plurality of joints according to a teaching play back system is disposed on a robot conveyer 12 for moving in a longitudinal direction of the conveyer 12. According to the illustrated embodiment, the teaching play back is embodied through a computer simulation. The coating robot is provided with a base potion 14, a pair of movable arms 16, 16 supported by the base portion 14, a movable wrist portion 18 which is connected with a tip end portion of the arm 16 and a controller 14A disposed in the base portion 14 for receiving operation control signals to control the movement of the respective portions of the robot 10. On the movable wrist portion 18 is mounted a coating gun 20 for performing an electrostatic coating.

The coating gun 20 receives a high voltage power supply for making the electrostatic coating from a voltage generating section 22, control air for switching a coating pattern through a switching valve 24 disposed on a first air passage 25, and additional control air for switching a coating atomization pressure through a switching valve 26 disposed on a second air passage 27. To the gun 20 are introduced a coating material of a selected color, selected by a color selection section 30 through a coating material passage 35 in which an on-off valve 32 is provided, and a discharge amount control section 34. The discharging control section 34 receives a control air for switching a discharging amount of the coating material from the gun 20 through a third air passage 29 in which a switching valve 28 is disposed for switching the discharging amount of the coating material.

The coating robot 10 is connected with a robot control unit 40 which produces a control signal Sa to the on-off valve 32 on the coating material passage 35, a control signal Sp to the switching control valve 24, a control signal Sv to the voltage generating section 22, a control signal Sc to the switching valve 28, a control signal Sq to the switching valve 26 and control signal Sx to the robot control section 14A when a coating action is done by the robot 10.

According to the illustrated embodiment, the control signals Sa, Sp, Sv, Sc, Sq and Sx to the on-off valve 32, pattern switching valve 24, voltage generating section 22, discharging amount switching valve 28, atomization pressure control valve 26 and control section 14A is properly set by utilizing the computer simulation method for the coating robot 10. In order to perform the teaching of the robot 10, the control variables of the coating robot is determined based on the following procedure.

Figure 2:
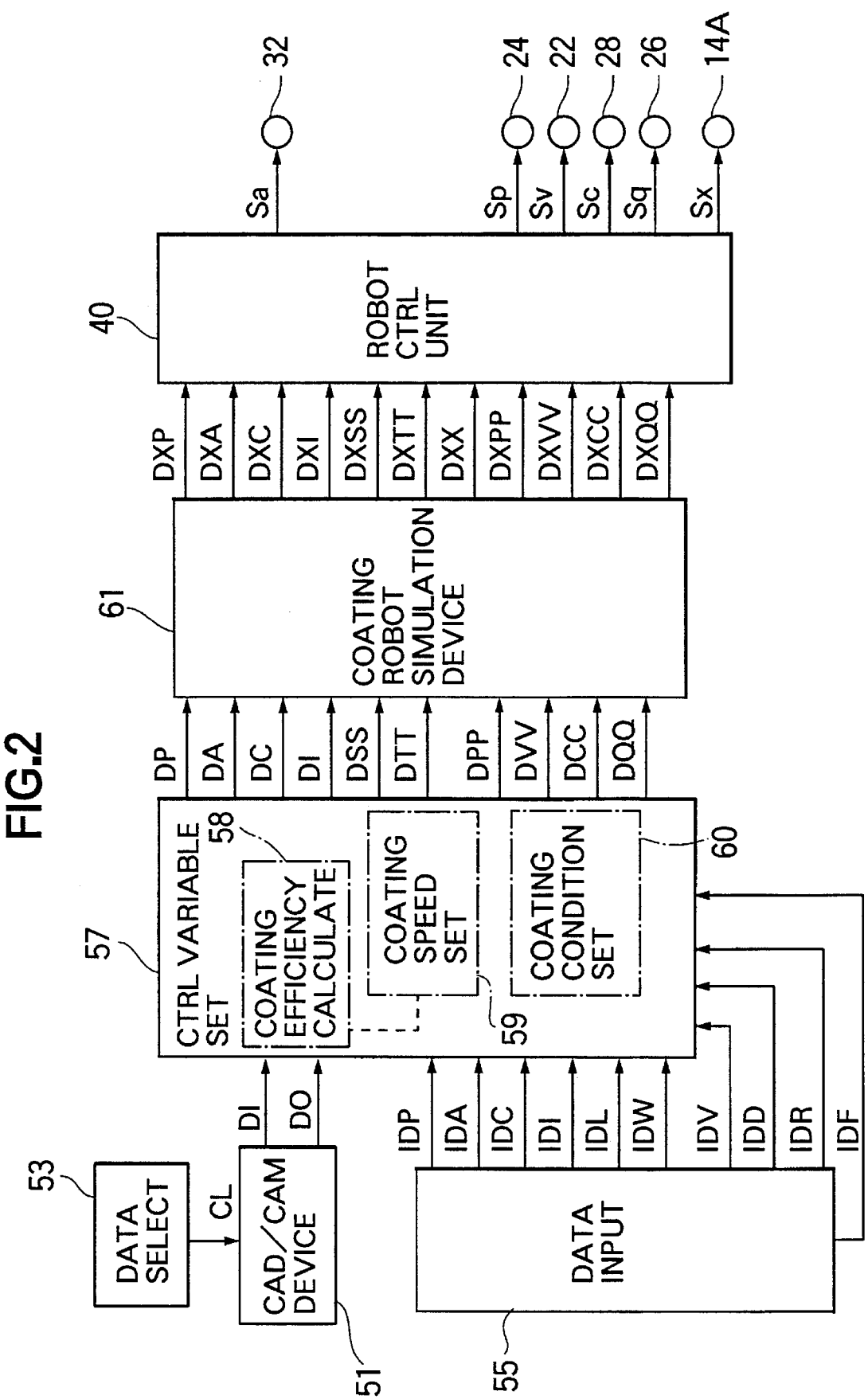
FIG. 2 is a block diagram showing a teaching system for a robot.
Figure 3:
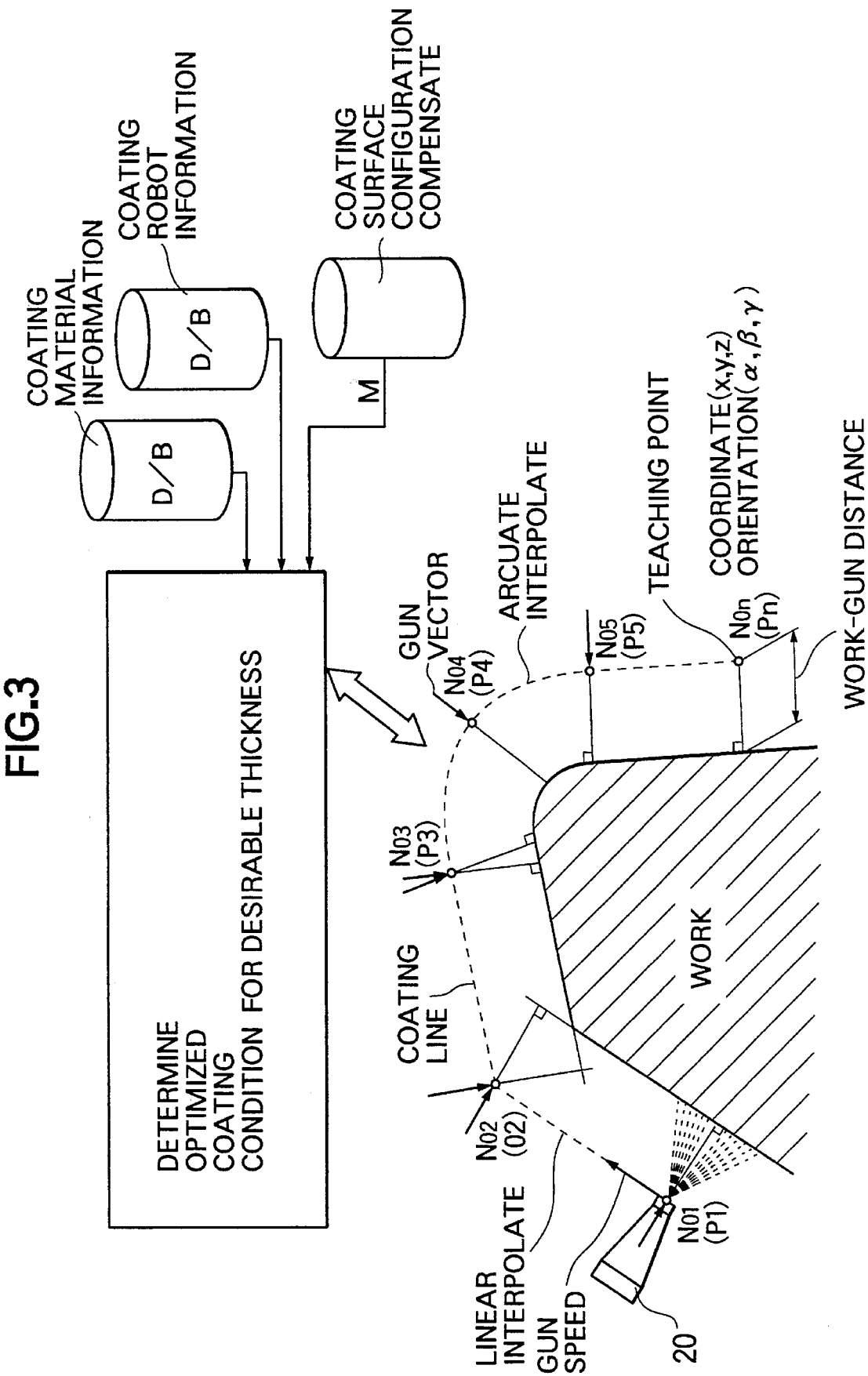
FIG. 3 is a schematic view showing a moving line of a coating gun.

In FIG. 2, there is shown the teaching play back system (simulation teaching play back system) for performing the teaching utilizing a computer simulation method for the robot 10. The teaching play back system includes the robot control unit 40. The system, in addition to the robot control unit 40, further includes CAD/CAM device 51, data selection section 53 attached to the device 51, data input section 55, control variable setting section 57 and coating robot simulation device 61. The CAD/CAM device 51 stores moving line data, as shown in FIG. 3, for representing a configuration of a coating surface of a work, such as a vehicle body on which a coating is made by the coating gun 20 which is mounted on the coating robot 10. The variable setting section 57 is provided with coating efficiency calculation section 58, coating speed setting section 59 and coating condition setting section 60 therein.

In performing a robot teaching by means of the computer simulation, the data selection section 53 is actuated to select data selection signals CL according to the word to be coated and send the signals CS to the CAD/CAM device 51. In the device 51, image data DI and moving line data DO are searched and selected in accordance with the signals CL and sent from the CAD/CAM to the variable setting section 57.

The data input section 55 is actuated so that the coordinate data IDP (X,Y,Z) for providing the No.1–No.n teaching points are manually inputted in order from the data input section 55 to the variable setting section 57. With regard to a plurality of teaching points No. 1–No.n, attitude data IDA($\alpha$, $\beta$, $\Gamma$) showing an attitude of the gun 20 to be taken, coating on/off data IDC (on/off data of coating) indicating whether a coating action is to be carried out, interpolation data IDI providing a interpolation between a current teaching point and a previous teaching point, longitudinal size data IDL of the coating pattern, lateral size data of the coating pattern IDW, coating electrostatic voltage data IDV showing an electrostatic voltage of the gun 20, distance data IDD showing a distance between the coating gun 20 and the work, coating thickness data IDR showing a coating thickness to be needed and configuration code data showing an unevenness of the coating surface of the work are entered.

The variable setting section 57 sends the coordinate data IDP, attitude data IDA, on/off data IDC, interpolation data IDI from the data input section 55 to a robot simulation device 61 as coordinate data DP, attitude data DA, on/off data DC and interpolation data DI. The variable setting section 57 determines a coating pattern control variable showing a coating pattern on the word, electrostatic voltage control variable showing the electrostatic voltage of the coating gun 20, coating material amount control variable showing a delivery amount of the coating material from the coating gun 20 and coating atomization pressure control variable showing a coating atomization pressure of a coating gun 20 and further determines coating pattern data DPP, coating electrostatic data DVV, coating amount data DCC and coating atomization data DQQ denoting the coating patter control variable, coating electrostatic voltage variable, coating material amount control variable and coating atomization control variable and sends them to the robot simulation device 61.

Further, the coating efficiency calculation section 58 of the control device setting section 57 calculates the coating efficiency P$\mu$ based on the coordinate data IDP on the moving line of the gun which is provided by the moving line data DO concerning the respective teaching points P1–Pn. The coating efficiency P$\mu$ shows a ratio of an amount of a coating material deposited on the coating surface of the work for forming a coating to a total amount of the coating material discharged from the coating gun 20 toward the coating surface. The coating means that the coating material is applied on the coating surface from the gun 20 to be deposited and naturally dried and shrunk to form a final coating layer. The coating efficiency P$\mu$ concerning the respective teaching points shown in FIG. 3 P1–Pn is calculated based on the multi regression analysis method using the coating atomization pressure data DQQ, coating delivery data DCC, and coating electrostatic voltage data DVV determined in the setting section 60, and configuration code data IDF and distance data IDD from the data input section 55.

In particular, the coating efficiency P$\mu$a can be provided as follows, when the coating electrostatic voltage is between 0–60 KV:

$$P\mu a = -K1*Qq + K2*Cc + K3*Vv - K4*Dd + K5 \tag{1}$$

Wherein Qq(g/cm$^2$) is the coating atomization pressure at the coating gun 20 shown by the atomization pressure DQQ, Cc(cc/min) is a discharged amount of the coating material from the coating gun 20 shown by the coating amount DCC, Vv(KV) is a coating electrostatic voltage at the coating gun 20 shown by the coating electrostatic voltage data DVV, Dd(mm) is a distance from the coating gun 20 to the coating surface of the work shown by the coating gun distance data IDD, K1, K2, K3, K4 and K5 are constants.

When the electrostatic voltage is 60–90 KV, the coating efficiency P$\mu$b can be provided as follows:

$$P\mu b = (-K6*Qq + K7*Cc + K8*Vv - K9*Dd + K10)*M$$

Wherein M is a calculation compensation coefficient in accordance with a coating portion of a work which is specified by a code number provided for each of the coating portion, K6, K7, K8, K9 and K10 are constants.

The constants K1–K10 are provided as follows (according to one embodiment of the present invention):

K1=0.00313095

K2=0.00002380

K3=0.57665200

K4=0.02725000

K5=43.48620000

K6=0.00574375

K7=0.01593750

K8=0.30620400

K9=0.03133330

K10=35.5938000.

Further, the coating speed setting section 59 of the variable setting section 57 determines a coating time control variable Tg showing a time period needed to discharge a predetermined amount of the coating material from the coating gun 20 and gun moving speed control variable Vg showing a moving speed of the coating gun 20 at the respective teaching points P1–Pn shown by the coordinate data IDP, based on the longitudinal size data IDL, lateral size data IDW from the data input section 55 and the coating efficiency Pμ calculated in the coating efficiency calculating section 58 as optimized values for obtaining a desirable coating thickness shown by a desirable coating thickness data IDR. In other words, the coating time control variable Tg and gun moving speed control variable Vg are determined based on the input data from the input data input section 55 taking account of the coating efficiency Pμ calculated by the calculation section 58 so as be compensated based on the configuration code data.

Figure 4:
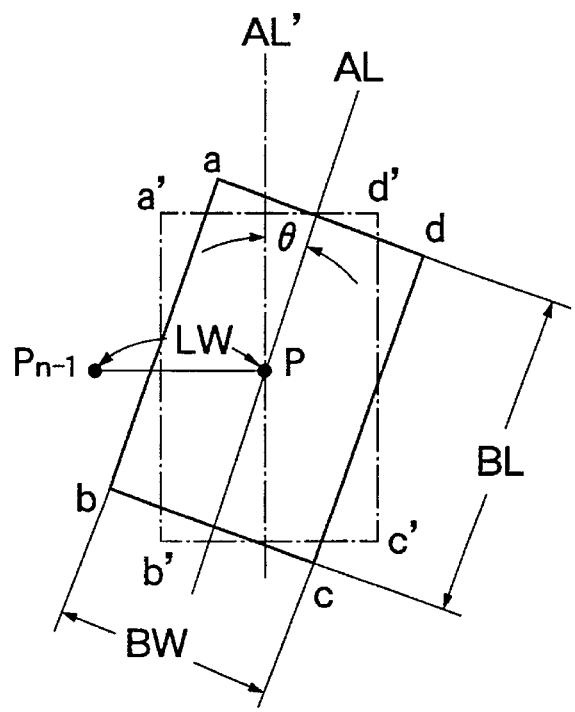
FIG. 4 is a schematic view for explaining how to determine a control variable.

The variables Tg and Vg are provided, for example, as follows:

$$Tg=Km[\Gamma d*Rp,\{BL*BW+LW(BL* \cos \theta+BW* \sin \theta)\}]/P\mu*Nv*\Gamma w*Up$$

$$Vg=Lw/Tg$$

Wherein Γd is a specific gravity of the coating material when dried,

Γw is a specific gravity of the coating material when it is in a liquid condition, Rp is a desirable coating thickness, BL and BW are the longitudinal and lateral sizes of the coating pattern, θ is an angle between a center line AL of a desirable coating pattern of a rectangle defined by points a, b, c and d with regard to a specific teaching point Pn on a moving line of the coating gun 20 and a center line AL' of an actual coating pattern defined by points a', b', c' and d' as shown in FIG. 4, Nv is a shrink volume ratio between a dried volume and a wet volume in a case where the coating material is applied on the coating surface by the coating gun 20 and dried, Up is a discharging amount of the coating material, Lw is a moving distance of the coating gun 20 from a teaching point (Pn-1) to another teaching point (Pn) as shown in FIG. 4, Km is a constant.

Then the coating speed setting section 59 determines the coating gun speed data DSS providing the coating gun moving speed control variable Vg and coating time data DTT providing the coating time control variable Tg and sends them to the coating robot simulation device 61.

As aforementioned, in the control variable setting section 57, the various control variables are determined with regard to the respective teaching points which are specified by the coordinate data IDP selected among the gun moving line data DO which denotes a moving line or path of the coating gun 20. For this purpose, the coating efficiency Pμ is calculated in the coating efficiency calculation section 58. Thereafter, in the speed setting section 59, the gun speed control variable Vg showing the gun moving speed of the coating gun 20 and the coating time control variable Tg showing the time period necessary to discharge a predetermined amount of the coating material from the coating gun 20 are determined based on the longitudinal size data of coating pattern IDL, lateral size data of coating pattern, coating electrostatic voltage data IDV, the coating gun distance data IDD and the desirable coating thickness data IDR which is determined in the speed setting section 59 and the coating efficiency Pμ calculated in the control variable setting section 57.

On the other hand, the robot simulation device 61 moves the coating gun 20 to the work for the robot 10 and performs the coating action simulation based on the coordinate data DP, attitude data DA, coating on/off data DC, interpolation data DI, coating pattern data DPP, coating electrostatic voltage data DVV, coating amount data DCC, coating atomizing pressure data DQQ, coating gun speed data DSS and coating time data DTT which are supplied by the control variable setting section 57. In the course of the above operation, the simulation device 61 compensates the coordinate data DP, attitude data DA, coating on/off data DC, interpolation data DI, coating pattern data DPP, coating electrostatic voltage data DVV, coating amount data DCC, coating atomizing pressure data DQQ, coating gun speed data DSS and coating time data DTT, if necessary.

At the time of the simulation, the simulation device 61 finally forms a coordinate data DXP, attitude data DXA, coating on/off data DXC, interpolation data DXI, coating pattern data DXPP, coating electrostatic voltage data DXVV, coating amount data DXCC, coating atomization pressure data DXQQ, coating gun speed data DXSS and coating time data DXTT in correspondence with the coordinate data DP, attitude data DA, coating on/off data DC, interpolation data DI, coating pattern data DPP, coating electrostatic voltage data DVV, coating amount data DCC, coating atomization pressure data DQQ, coating gun speed data DSS and coating time data DTT and forms new control data DXX to supply the robot control unit 40.

The robot simulation unit 40 stores the above data and forms action control signals Sa based on the coating on/off data DXC, signals Sv based on the coating electrostatic voltage data DXVV, signals Sc based on the coating amount data DXCC and signals Sq based on the coating atomization pressure data and further signals Sx based on the coordinate data DXP, attitude data DXA, interpolation data DXI, coating gun speed data DXSS and control data DXX in accordance with a control programs to control the on-off valve 32, coating pattern switching control valve 24, voltage generation section 22, coating amount switching control valve 28, coating atomization pressure switching control valve 26 and robot control section 14A disposed in the base portion 14 of the robot 10.

According to the above method of determining control variables for the coating robot 10, the robot teaching for a robot 10 of which coating gun is expected to move on a predetermined moving line can be made with an improved accuracy so as to obtain a desirable coating wherein the control variables are calculated corresponding to the configuration of the coating surface of the work utilizing the coating efficiency Pμ with regard to a plurality of teaching points.

According to another embodiment of the present invention, there are provided a robot control unit 40, CAD/CAM device 51, control variable setting section 57 and robot simulation device 61 as well as the former embodiment.

In accordance with a flowchart shown in FIG. 5, another embodiment of method for automatically evaluating a coating sag or coating control method by means of a computer simulation according to the present invention will be explained hereinafter.

Figure 5:
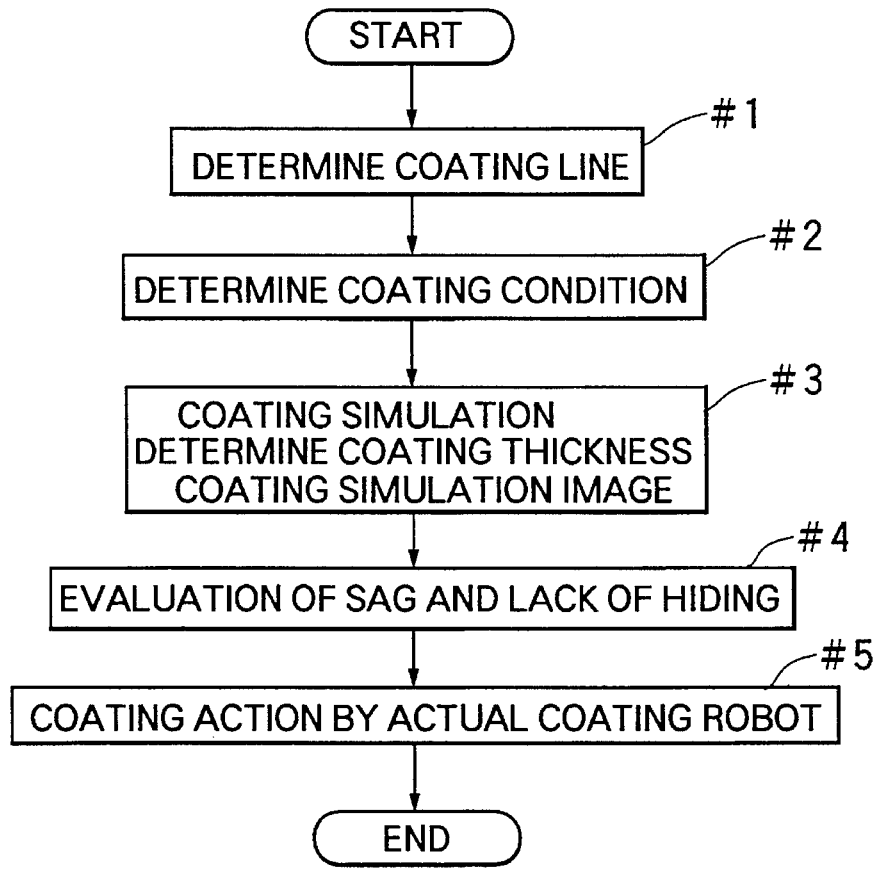
FIG. 5 is a flow chart showing an automatic evaluation of a coating sag and lack of hiding.
Figure 8:
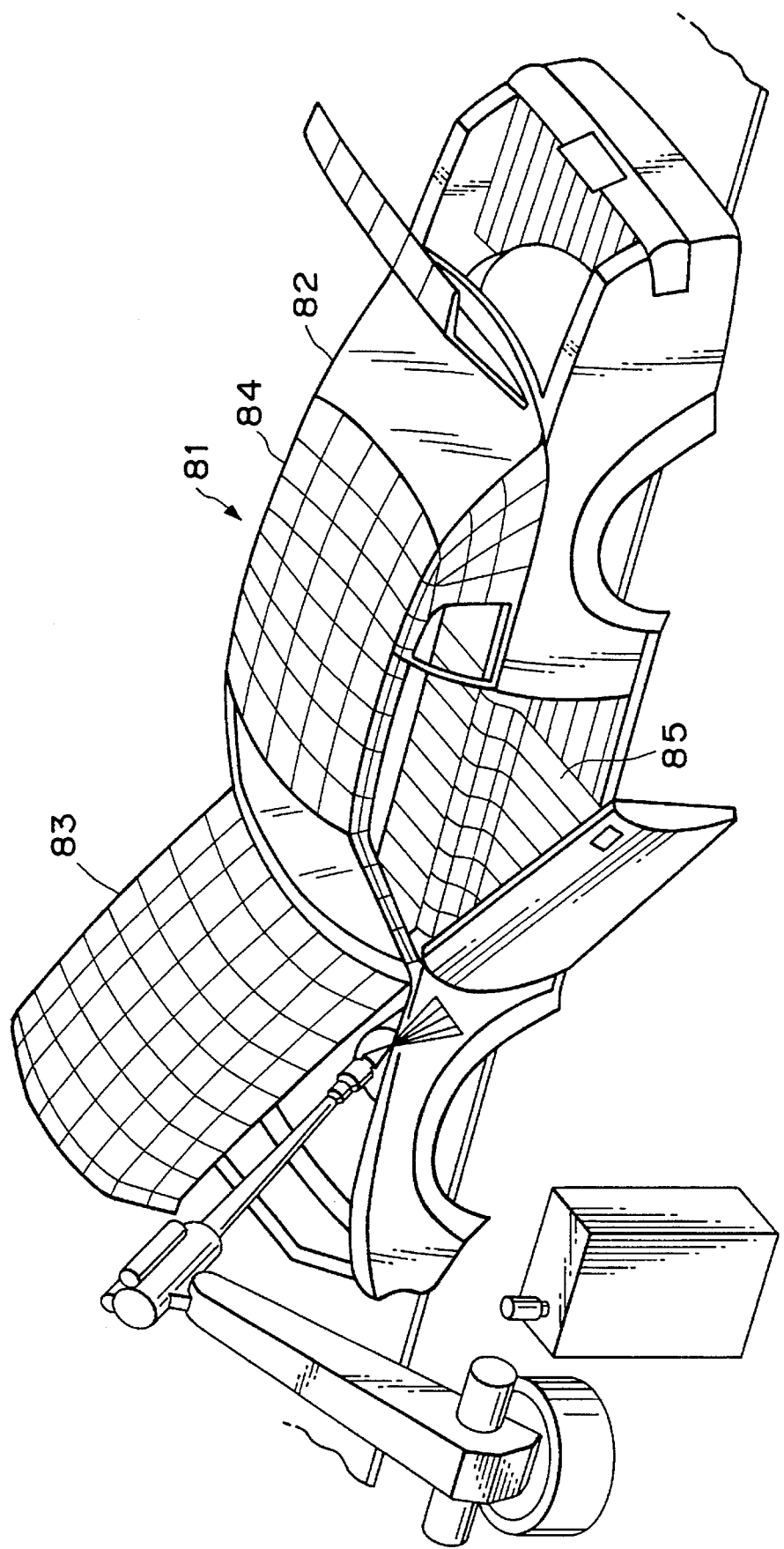
FIG. 8 is a perspective view of an object with a surface model for a CAD simulation.

In step #1 of FIG. 5, the control unit 40 determines a coating line of the coating robot. For this purpose, a robot action simulator as shown in FIG. 8 is utilized to display the coating robot, work body to be coated and the like on a CRT and determines the coating line which the coating robot is supposed to take during the coating action of the work body.

In step #2, the control unit 40 sets proper coating conditions for obtaining a desirable coating thickness along the coating line set in the step #1. A general CAD/CAM system can be used for making the coating line of the robot.

In step #2, the control unit 40 determines appropriate coating condition for obtaining a desirable coating thickness on the coating line determined in the step #1. The evaluation as to whether or not a coating sag is produced on an inclined coating surface cannot be accomplished.

In step #3, a coating simulation is performed to determine a coating thickness and forms a simulation image thereof. In other words, a coating gun is moved on a surface model of a work for a CAD simulation model which the coating line in addition to the coating conditions are provided. Then, the coating thickness of a simulation image of coating is determined through the CAD simulation.

In step #4, an automatic evaluation for the coating sag is performed corresponding to the inclination of the coating surface. Namely, the automatic evaluation is made regarding the coating thickness which is determined using a surface model of a work to be coated. In step #5, the teaching program prepared through the simulation is transferred to an actual robot to operate. Thus, a desirable coating thickness can be obtained without producing a coating sag, lack of hiding or the like.

Hereinafter, the evaluation method of a coating sag and lack of hiding is specifically explained.

The coating line is determined in accordance with the aforementioned method. Then, the control unit 40 determines automatically appropriate coating conditions for obtaining a target coating thickness with regard to the coating line. The coating conditions are added to the coating line data so that the coating gun is actuated in accordance with a simulation program using a computer to determine the coating thickness regarding a surface model which is a simulated coating surface of a work model in the CAD simulation, and thus determines a coating in the simulation system or a simulation image of a coating.

Figure 6:
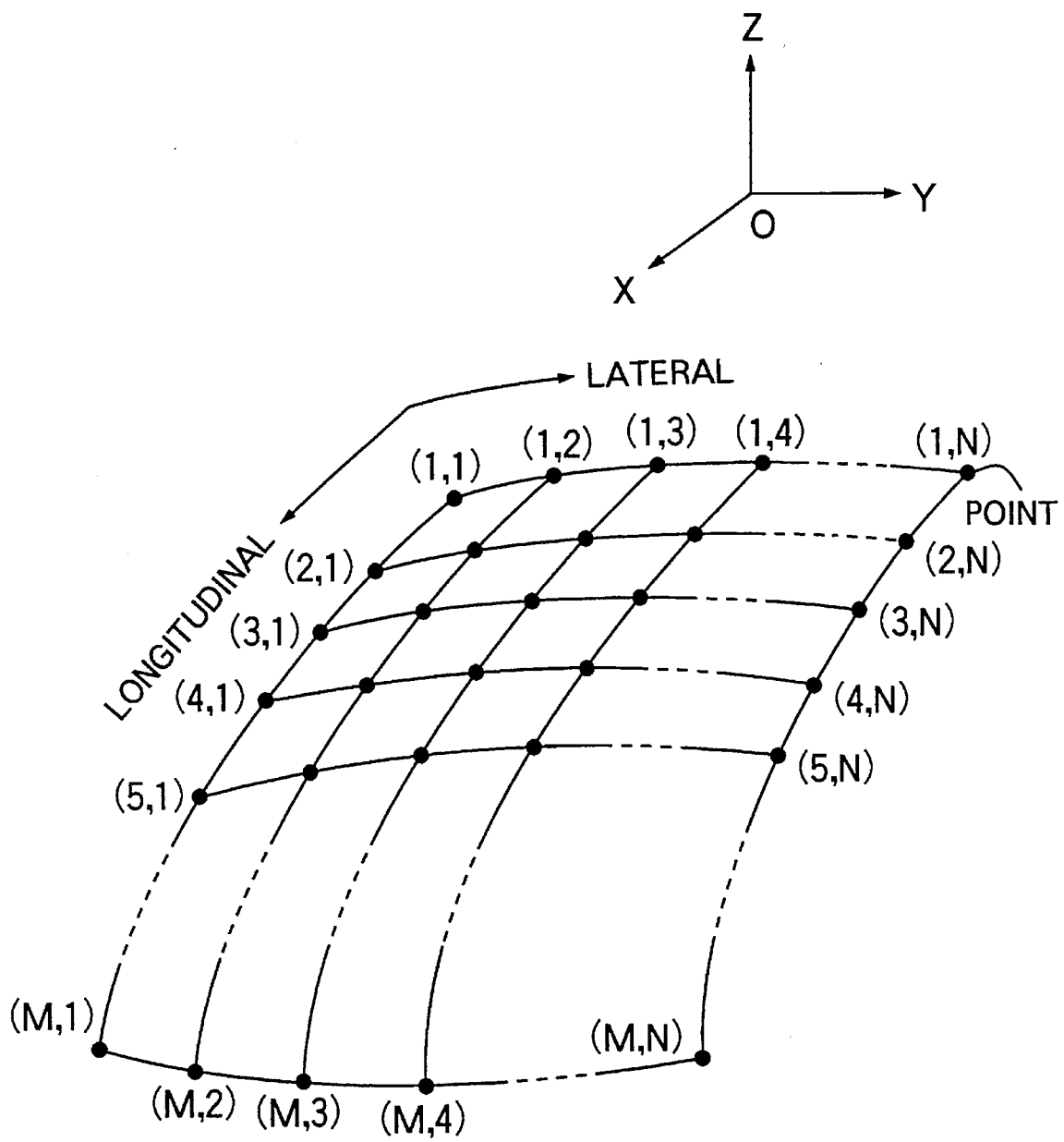
FIG. 6 is a schematic view of a surface model of a work which is used for a CAD simulation.
Figure 7:
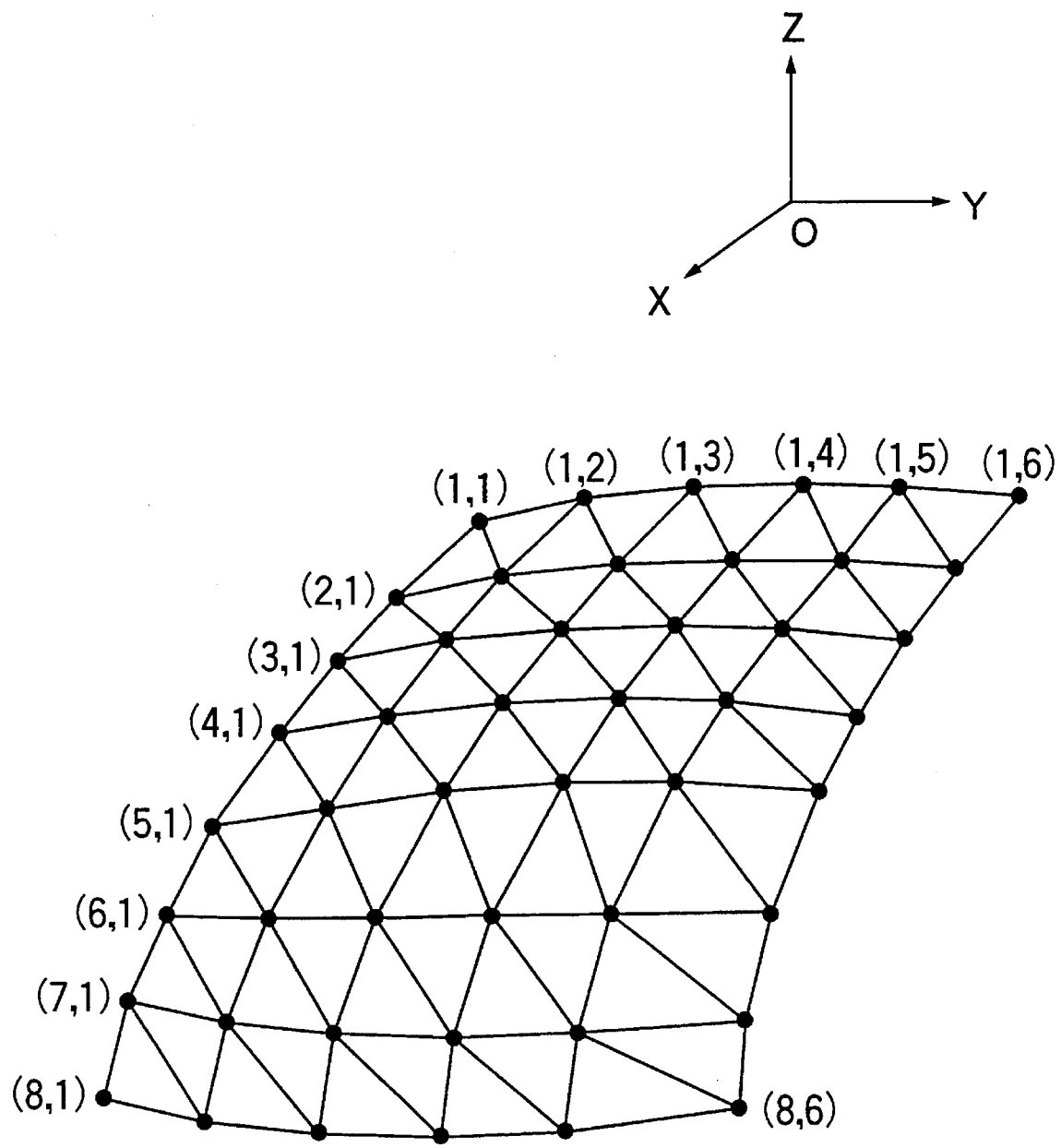
FIG. 7 is a a schematic view of a surface model of a work to be coated through a CAD simulation for automatically evaluating whether or not a coating sag and/or lack of hiding is produced as a coating surface is inclined.

As shown in FIG. 6, the surface model of the work CAD which is used for the automatic evaluation taking account of the inclination of the coating surface is defined by M points by N points on three dimensional coordinate (X, Y, Z). These points are connected by interpolation lines or straight lines to form small fractions or patch like configurations. For example, M=8 (column), N=6 (row) are provided in FIG. 7. The M points and N points are longitudinally, laterally and diagonally connected with each other.

Referring to FIG. 8, a vehicle body, robot, control box are shown in the form of surface model prepared as aforementioned. The surface model of CAD is constituted by patch like portions of a vehicle body 81 including bonnet 83, roof 84, floor 58 and the like. Meanwhile, spline models and/or line models are used for representing other portions and solid models are used for the robot.

Figure 9:
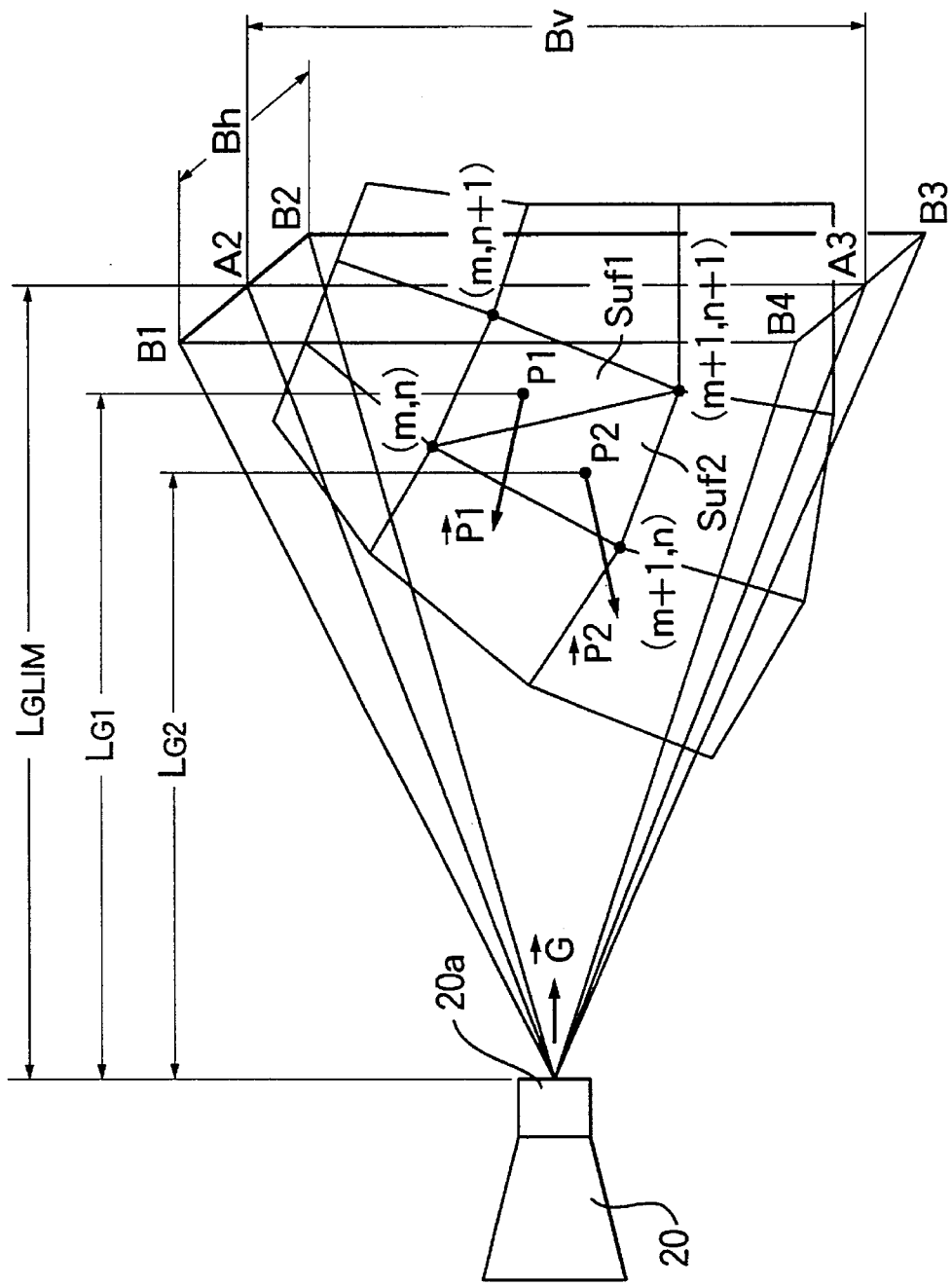
FIG. 9 is a schematic view explaining how to determine a simulation image of a coating through a simulation.
Figure 10:
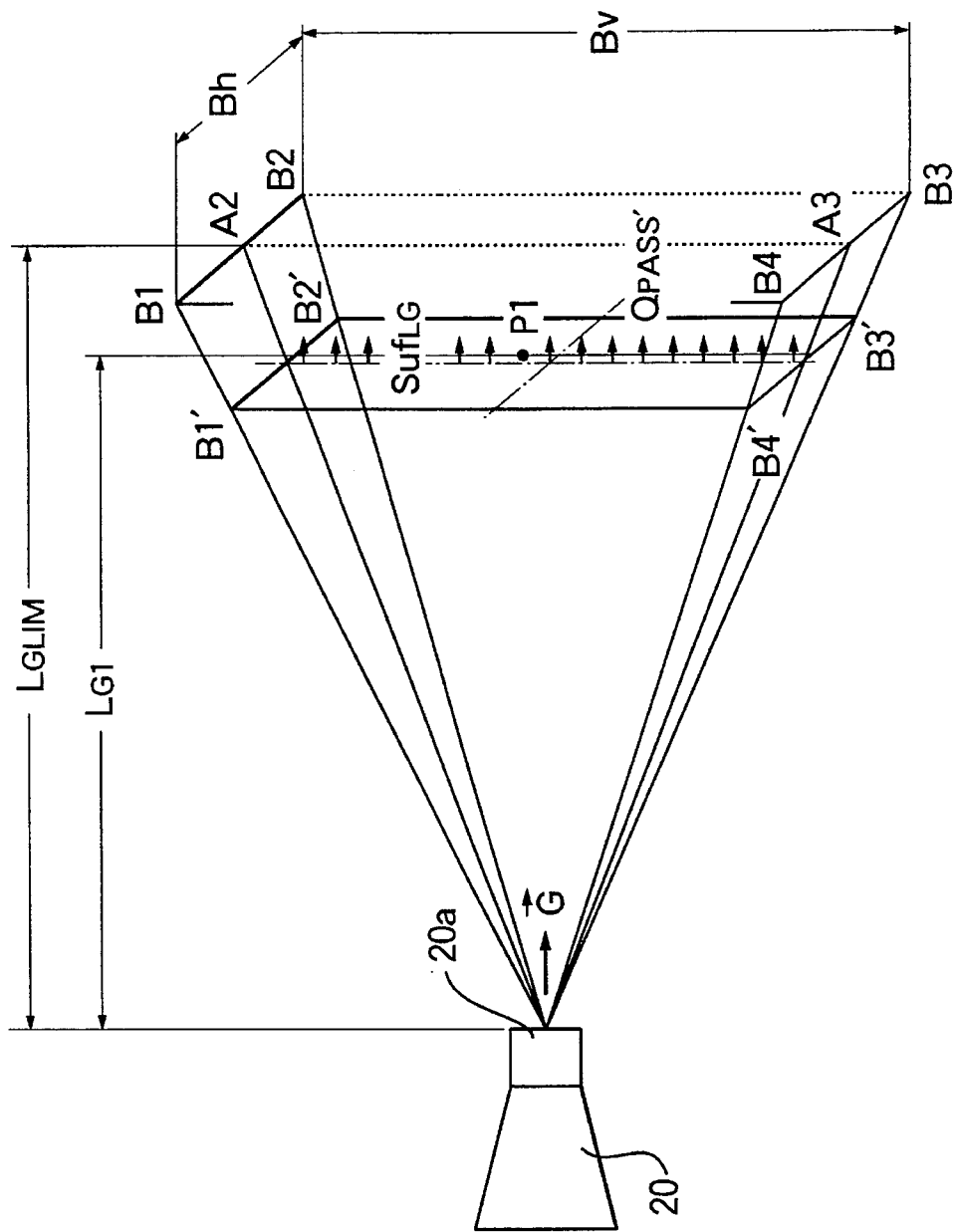
FIG. 10 is a schematic view showing a relationship between a section and a quantity of a coating material passing therethrough.

Hereinafter, a process for forming a coating simulation image on the CAD surface models in accordance with the computer simulation will be explained making reference to FIG. 9.

(1) The various coating conditions determined as aforementioned is introduced to the coating robot simulation device 61 in the coating condition setting process.

(2) A pyramid is determined having a height LGLIM which is a gun-work distance between the gun and the work and a bottom of a rectangle defined by an effective longitudinal coating pattern size Bv and an effective lateral coating pattern size Bh.

(3) A patch of the surface model of the CAD work which crosses the above determined coating pattern pyramid is selected.

(4) With regard to all the patches selected, the following treatment is made. The explanation for the treatment is made with regard to a specific patch defined by the points (m, n), (m, n+1), (m+1, n), (m+1, n+1).

(i) A gravity center P1 of a surface Suf1 (a coating surface) and a triangle defined by three points (m, n), (m, n+1), (m+1, n+1) are determined.

(ii) A distance LG1 between a tip end 20a of the coating gun 20 and the gravity center P1 is determined.

(iii) Comparing the effective gun/work distance LGIM with the distance LGI, if LGLIM>LGI, it is assumed that the coating material is not deposited on the surface Suf1 and in this case, a procedure (xiii) is carried out.

(iv) A nominal vector P1 of the surface Sufl is determined. mined.

(v) An angle $\mu GP$ between the gun vector G and the nominal vector P1 is determined as an inclination of the coating surface against the coating gun.

(vi) It is assumed that the coating material from the tip end 20a of the coating gun 20 with the discharge amount Qp is uniformly dispersed in the coating pattern pyramid. The amount of the coating material Qpass' which passes the section SufLG (including P1), which is a plane constituting a bottom surface of the pyramid with a height of distance LG1, during a unit time period is determined. The area of the section SuflG is determined. The value of Qpass' is converted to a value Qpass which is an amount of the coating material passing through a unit area in a unit time period.

Figure 11:
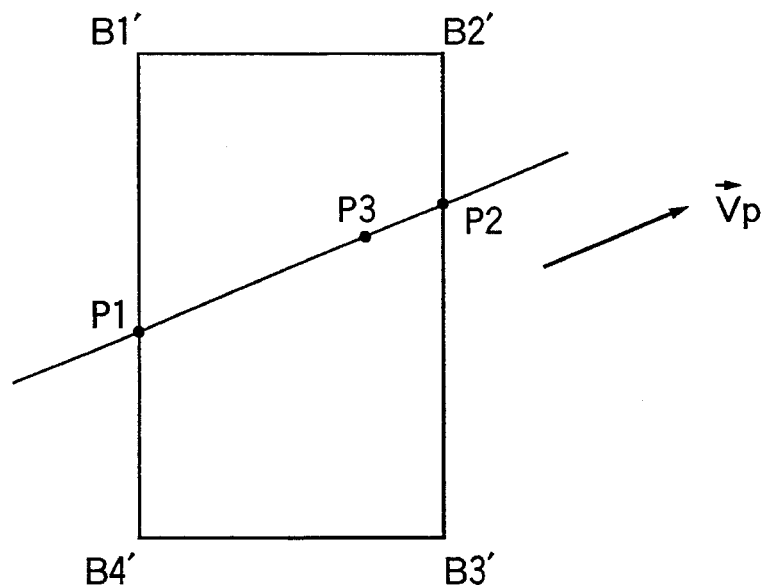
FIG. 11 is a schematic view explaining a time necessary for a coating gun to pass through a predetermined distance.

(vii) A time period Tpass, which is necessary for the section constituting a bottom surface of pyramid with a distance LG1 from the gun crosses the plane SufLG, is determined. The time period Tpass is provided as a time period which is necessary for the gun with a moving speed Vp to move from the gravity point P1 to another point P2 (see FIG. 11). If the gun 20 does not move for a predetermined time period, the time period Tpass is set at the predetermined time.

(viii) An amount of the coating material QSufLG supplied to the section SufLG by the values Qpass and Tpass is calculated (QSufLG=Qpass*Tpass).

(ix) An amount of the coating material QSuf1 deposited on the coating surface Sufl of the amount the coating material QSufLG which is supplied to the section SufLG utilizing the coating efficiency P$\mu$ and the inclination of the coating surface 8GP against the coating gun 20 as follows;

$$QSuf1 = P\mu * \cos \theta GP * QSufLG$$

Meanwhile, the coating efficiency P$\mu$ calculated utilizing a multi regression analysis based on the gun/work distance, coating electrostatic voltage, coating atomization pressure and the like can be compensated in accordance with the distance LG1.

(x) An area Asuf1 of the coating surface Suf1 is determined.

(xi) the coating thickness μPA, which is formed by the coating material Qsufl deposited on the coating surface Sufl and dried, is determined in accordance with the volume shrink rate Nv of the coating material, a specific gravity Γw of the liquid coating material, a specific gravity Γd of the dried coating material, area Asufl of the coating surface Sufl as follows;

$$\mu PA = \Gamma w * QSufl * Nv/\Gamma d * Asufl$$

(xii) The simulation image of the coating is produced on a CRT, for example, by coloring the coating surface Sufl in accordance with the coating thickness μPA.

(xiii) With regard to a coating surface Suf2 of a triangle defined by points (m,n), (m,n+1) and (m+1, n+1), a simulation image is produced by the same manner as aforementioned in connection with the coating surface Suf1.

In accordance with the procedure as aforementioned, the simulation image of coating in a patch, which is defined by the points (m,n), (m,n+1), (m+1, n) and (m+1, n+1), is determined.

Hereinafter, a coating action according to the CAD simulation will be explained.

Figure 12:
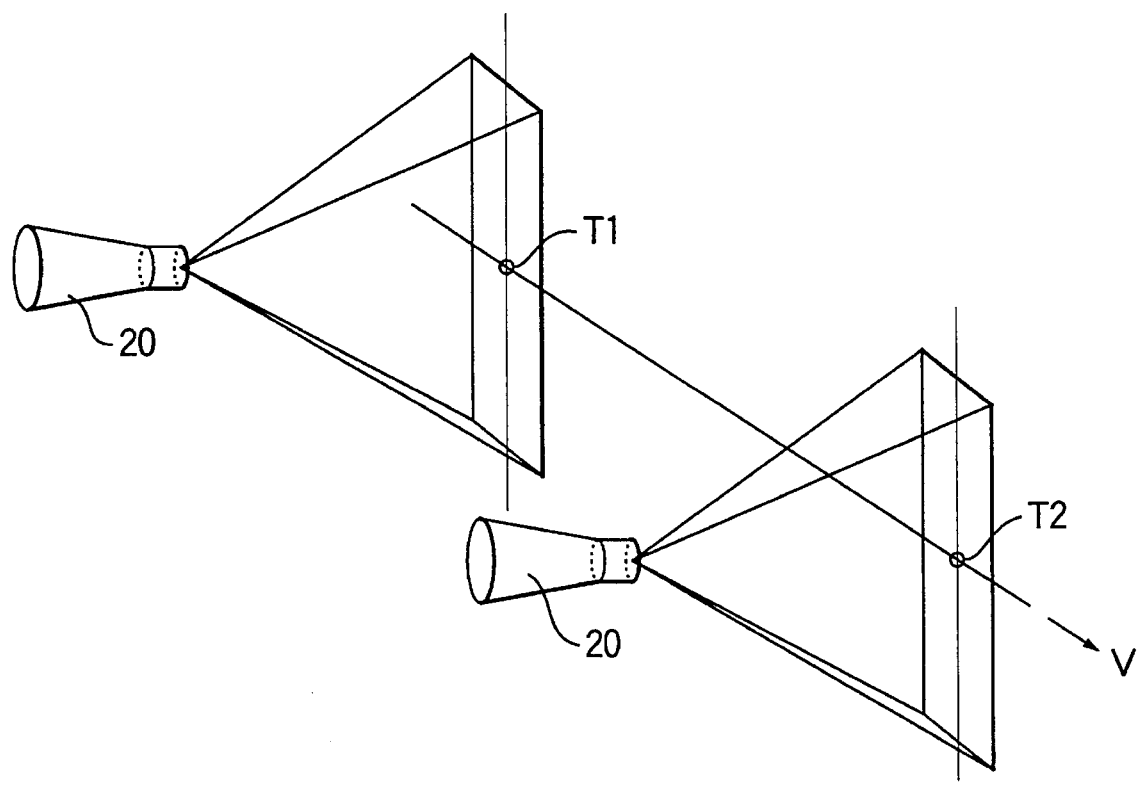
FIG. 12 is a schematic view showing a CAD simulation.

As shown in FIG. 12, the coating gun 20 and coating pattern is displayed on the screen. The coating gun 20 is moved at a predetermined moving speed V along a coating line which is defined by connecting coating points 1–N (T1 and T2 in the illustrated embodiment). The position on the coordinate and attitude or orientation of the gun 20 at the respective coating points are automatically determined by means of a manual operation or by means of computer. In this case, the coordinate and the attitude of the gun 20 at the coating points 1–N is exhibited by a vector and the like. The coating line is determined using a straight line interpolation connecting adjacent two coating points, arcuate interpolation connecting three consecutive coating points and the like.

Figure 13:
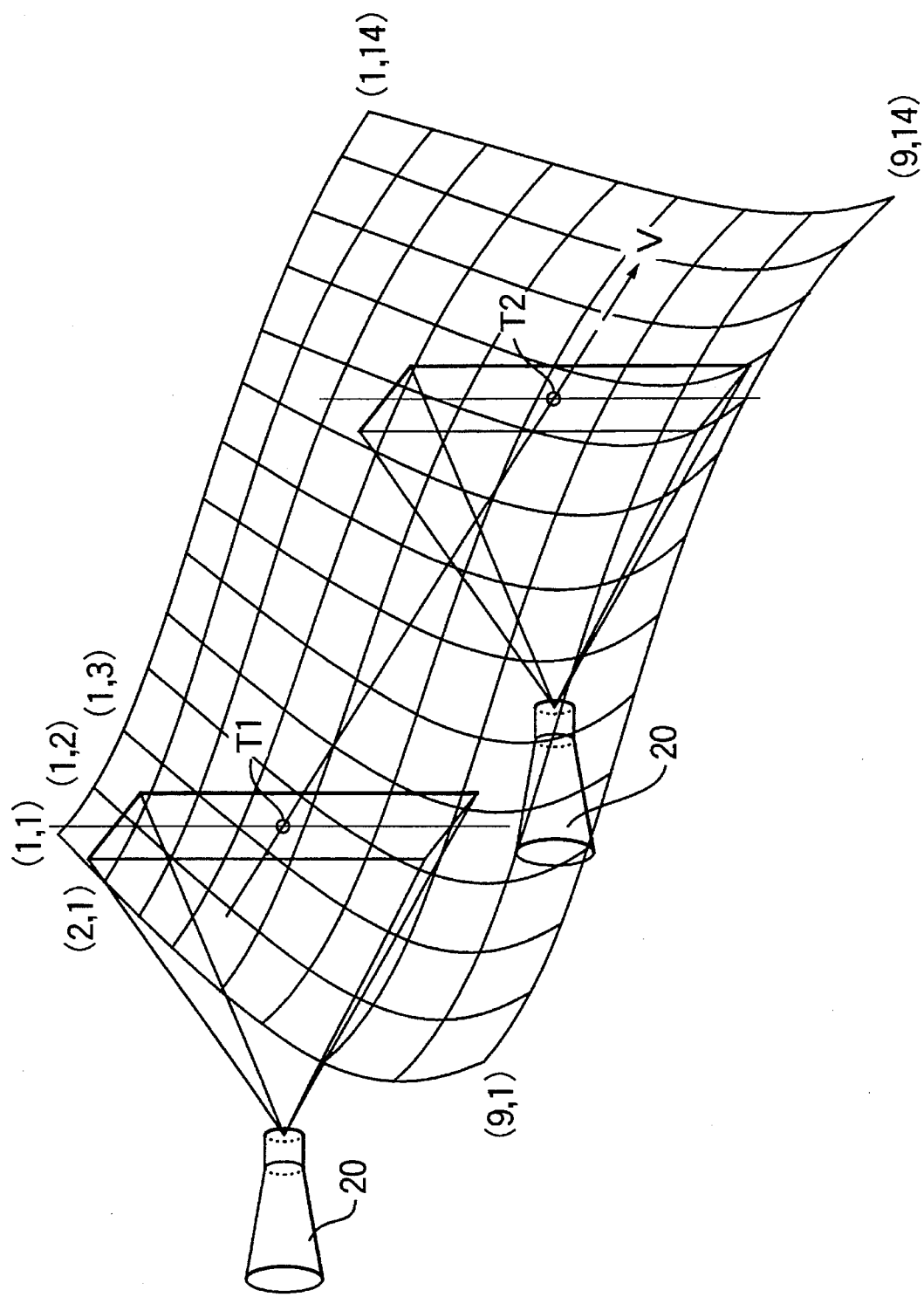
FIG. 13 is a schematic view showing a CAD simulation.

FIG. 13 shows a surface model of a work to be coated, which is produced by utilizing CAD and is displayed on the screen.

The surface model of the work is supposed to be coated in the simulation wherein a coating action is applied on each of the patches.

Hereinafter, it is described that a relationship between an inclination angle of the coating surface and a critical coating thickness at which a coating sag is about to be produced in the vertical direction. A data base concerning basic characteristics of the coating material, such as weight reduction rate as the coating material is dried, specific gravity of the coating material in the liquid state, which are determined in advance, includes a critical coating thickness μMAX1 of a vertical coating surface at which a coating sag begins to be produced when the gun 20 blows out the coating material onto a vertical coating surface.

Generally, a coating material has characteristics as a thixotropic fluid (plastic fluid). A coating material of a kind of the thixotropic fluid exhibits a static friction resistance against the coating surface wherein the coating material does not flow until the coating material is subjected to a force greater than the static frictional resistance. As a result, the coating material is able to be deposited on a vertical surface and stay for a long time to form a predetermined thickness of coating.

Figure 14:
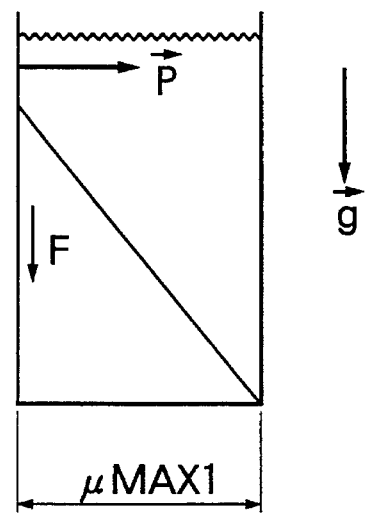
FIG. 14 is a schematic view explaining a critical coating thickness on a vertical coating surface.
Figure 15:
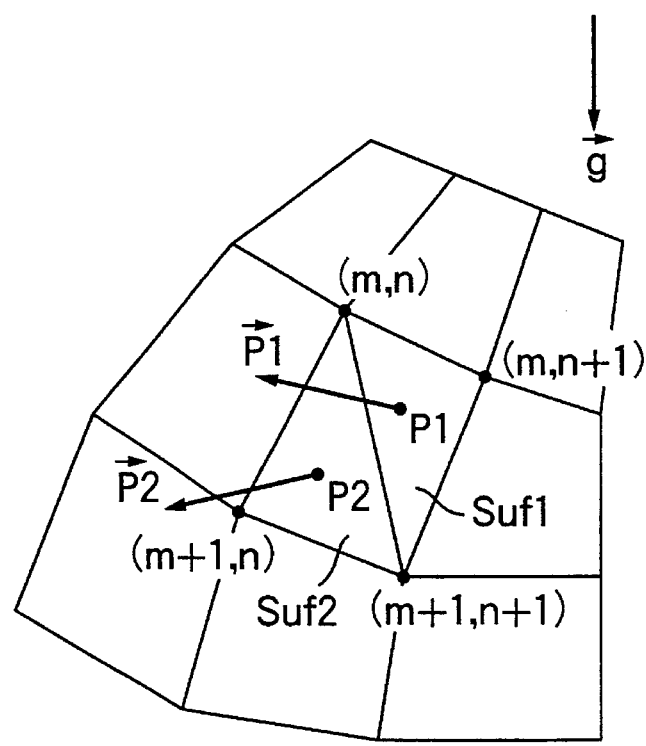
FIG. 15 is a schematic view explaining an automatic evaluation of a coating sag and/or lack of hiding using a simulation image of coating which is prepared based on a surface moved through a CAD simulation.

The relationship between the critical coating thickness μMAX1 and the gravity force g is determined as follows wherein τstat (kgf/m$^2$) is a static frictional resistance (see FIG. 14).

The relationship between a force F acting on the coating surface when the coating material is deposited by the critical coating thickness μMAX1 on a vertical coating surface is provided as follows;

$$F = \tau stat * A_0 = \Gamma w * \mu MAX1 * A_0$$

The force F means a critical force at which a coating sag is produced.

Next, the evaluation of the coating is made in a case where the coating surface is inclined.

The inclination of the coating surface is denoted by an angle θgp between a vector g of the gravity force and a nominal vector P. Thus, when the angle θgp is 90 degree, the coating surface is a vertical one. When the angle θgp is 0 degree, the coating surface is a horizontal one. Thus, the angle θgp takes a value between 0 and 90.

A relationship between the critical force F and a critical coating thickness μMAX2 on an inclined coating surface of the inclination angle θgp is provided as follows;

$$F = \tau stat * A_0 = \Gamma w * \mu MAX2 * A_0 * \sin \theta gp$$

Therefore, a relationship between the critical coating thickness μMAX1 on the vertical coating surface and the critical coating thickness μMAX2 on the inclined coating surface of the inclination angle θgp is provided as follows;

$$F = \Gamma w * \mu MAX1 * A_0 = \Gamma w * \mu MAX2 * A_0 * \sin \theta gp (= \tau stat * A_0)$$

Thus, the critical coating thickness μMAX2 is provided by using the inclination angle θgp and the critical coating thickness of the vertical surface μMAX1 as follows;

$$\mu MAX2 = \mu MAX1 / \sin \theta gp.$$

Accordingly, if the inclination angle θgp is 0, the coating thickness is theoretically infinite. The critical coating thickness can be provided in another way using surface tension of the coating material.

Next, an automatic evaluation of the coating sag and lack of hiding will be explained hereinafter using a simulation coating image produced based on the surface model.

A data base concerning the characteristics of the coating material, which is prepared in advance, includes, with regard to each of the coating materials the critical coating thickness μMAX1 for a coating sag in a vertical surface and a critical coating thickness μMAX3 for a lack of hiding in which the coating surface of the work appears through the coating.

Where the coating surface is inclined, the automatic evaluation of the coating sag and the lack of hiding is made, using the coating thickness determined for each of the patches of the surface model of the work in terms of CAD, in accordance with the following steps.

(1) A coating material, which is used for coating surface model of the work in terms of CAD, is specified. Then, the critical coating thickness μMAX1 for the coating sag in a vertical coating surface and the critical coating thickness for the lack of hiding are determined.

(2) The following treatment is made on each of the patches. In the illustrated embodiment, the treatment is explained with regard to one patch which is defined by three points (m, n), (m, n+1), and (m+1, n+1).

(i) A coating thickness μSuf1 of a coating material deposited on the patch defined by the three points (m, n), (m, n+1), and (m+1, n+1) is determined.

(ii) The coating thickness μSuf1 is compared with the critical coating thickness μMAX3. If μSuf1<μMAX3, it is held that the lack of hiding is produced. Then the step is advanced to a step (vii).

(iii) A nominal vector P1 is determined of a surface Suf1.

(iv) An angle θgp1 between the gravity force vector g and the nominal vector P1 is determined. The angle θgp1 means an inclination angle of the coating surface against the direction of gravity. The angle θgp1 takes a value between 0 and 180 degree.

(v) The critical coating thickness μMAX2 at which the coating material starts sagging when the coating surface is inclined beyond the angle θgl1 is determined in accordance with the aforementioned method.

(vi) The coating thickness μSuf1 is compared with the critical coating thickness μMAX2 for the coating sag. When Suf1>μMAX2, it is evaluated that the coating sag is produced.

(vii) the above steps (i)–(vi) are applied on another patch defined by three points (m,n), (m+1, n), (m,n+1), (m+1,n+1).

Through a series of steps from the above (i)–(vi), the evaluation concerning the coating sag and the lack of hiding can be accomplished.

In this case, in evaluating the coating sag, the coating thickness μ is indicated by a wet state of the coating.

If the coating sag and/or the lack of hiding is held to be produced on the patch surfaces Suf1 and/or Suf2 through the above simulation, a colored map may be prepared to indicated the coating sag and/or the lack of hiding on the coating surfaces Suf1 and Suf2 which are displayed on the screen, CRT or the like of the simulation system. In this case, it is warned of the coating sag and the lack of hiding and the simulation of the coating action is stopped if necessary.

If there is neither coating sag nor lack of hiding on the coating surface of the work, the teaching program prepared through the simulation in accordance with the above mentioned steps is transferred to an actual coating robot. The actual coating action is performed with the coating robot on which the teaching program is loaded.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A method for evaluating a coating sag comprising the steps of:

determining a coating thickness on each of a plurality of specific portions of a coating surface based on various coating condition parameters, evaluating an inclination of each of the specific portions of the coating surface relative to a vertical surface, determining a critical coating thickness on the vertical surface at which a coating sag is about to be produced, and evaluating whether a coating sag is produced on the specific portions of the coating surface, respectively, based on the inclination and the coating thickness in view of the critical coating thickness on the vertical surface.

2. A method as recited in claim 1 and further comprising the steps of:

determining a coating efficiency as a ratio of an amount of a coating material forming a coating actually deposited on the specific portions of the coating surface to an amount of the coating material discharged toward the specific portions of the coating surface from a coating gun, and determining the coating thickness of the specific portions of the coating surface by a simulation taking account of the coating efficiency.

3. A method as recited in claim 1 add further comprising the step of evaluating whether said coating sag is produced in a simulation using the coating condition parameters.

4. A method as recited in claim 1 and further comprising the step of controlling a coating robot in accordance with a result of evaluating whether the coating sag is produced.

5. A method as recited in claim 1 wherein the specific portions of the coating surface are formed on a vehicle body.

6. A method as recited in claim 1 wherein the specific portions of the coating surface are constituted by a plurality of patches and the step of evaluating whether the coating sag is produced is made on each of the patches.

7. A method as recited in claim 3 wherein the coating condition parameters include at least one of a discharging amount of coating material, a position of a coating gun, an orientation of the coating gun, an electrostatic voltage for a coating, an atomization pressure of the coating gun, a moving speed of the coating gun and a distance between the coating gun and the coating surface.

8. A coating control system for controlling a coating robot which performs automatic coating of a work comprising:

coating line determining means for determining a coating line along which the coating robot is moved over the work, data entry means for entering various data concerning the automatic coating performed by the coating robot, control variable determining means for determining coating control variables in accordance with the coating line determined by the coating line determining means and the various data entered by the data entry means, robot simulation means for performing a robot simulation of the coating performed by the coating robot based on the control variables so as to set a control program based on the robot simulation, and robot control means for controlling the coating robot in accordance with the control program set by the robot simulation means.

9. A system as recited in claim 8 and further comprising a coating gun for discharging a coating material toward a specific coating surface of the work, wherein the control variable determining means calculates a coating efficiency of the coating material as a ratio of an amount of the coating material forming a coating actually deposited on the specific coating surface to an amount of the coating material discharged toward the specific coating surface from the coating gun, and determines a coating thickness on the specific coating surface based on the coating efficiency.

10. A system as recited in claim 9 wherein the robot simulation means performs an evaluation of whether a coating sag is produced on the specific coating surface in accordance with the coating thickness determined by the control variable determining means and an inclination of the specific coating surface, and performs the robot simulation of the coating action based on the evaluation.

11. A method as recited in claim 2 wherein the coating condition parameters include at least one of a discharging amount of coating material, a position of a coating gun, an orientation of the coating gun, an electrostatic voltage for a coating, an atomization pressure of the coating gun, a moving speed of the coating gun and a distance between the coating gun and the coating surface.

12. A method for controlling a coating robot which performs automatic coating of a work comprising the steps of:

determining a coating line along which the coating robot is moved over the work, entering various data concerning the automatic coating performed by the coating robot, determining coating control variables in accordance with the coating line determined and the various data entered, performing a robot simulation of the coating performed, based on the coating control variables, so as to set a control program based on the robot simulation, and controlling the coating robot in accordance with the control program set.

13. A method as recited in claim 12 and further comprising the steps of:

discharging a coating material toward a specific coating surface of the work, calculating a coating efficiency of the coating material as a ratio of an amount of the coating material actually deposited on the specific coating surface to an amount of the coating material discharged toward the specific coating surface, and determining a coating thickness on the specific coating surface based on the coating efficiency.

14. A method as recited in claim 13 and further comprising the steps of:

performing an evaluation of whether a coating sag is produced on the specific coating surface in accordance with the coating thickness and an inclination of the specific coating surface, and performing the robot simulation based on the evaluation.

* * * * *